United States Patent
Yamakaji

(10) Patent No.: US 8,669,009 B2
(45) Date of Patent: Mar. 11, 2014

(54) POSITIVE ELECTRODE ACTIVE MATERIAL OF POWER STORAGE DEVICE, POSITIVE ELECTRODE OF POWER STORAGE DEVICE, POWER STORAGE DEVICE, MANUFACTURING METHOD OF POSITIVE ELECTRODE ACTIVE MATERIAL OF POWER STORAGE DEVICE

(75) Inventor: Masaki Yamakaji, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 294 days.

(21) Appl. No.: 13/160,660

(22) Filed: Jun. 15, 2011

(65) Prior Publication Data

US 2012/0003538 A1   Jan. 5, 2012

(30) Foreign Application Priority Data

Jul. 1, 2010   (JP) ................. 2010-151440

(51) Int. Cl.
*H01M 4/13*   (2010.01)
(52) U.S. Cl.
USPC ... 429/231.95; 429/223; 429/224; 429/231.2; 429/231.3; 429/231.5
(58) Field of Classification Search
USPC ............. 429/223–224, 231.2, 231.3, 231.5, 429/231.95
See application file for complete search history.

(56) References Cited

U.S. PATENT DOCUMENTS

| | | | |
|---|---|---|---|
| 6,085,015 A * | 7/2000 | Armand et al. ............ | 385/140 |
| 6,685,804 B1 | 2/2004 | Ikeda et al. | |
| 6,730,434 B1 | 5/2004 | Kawakami et al. | |
| 6,887,511 B1 | 5/2005 | Shima et al. | |
| 7,192,673 B1 | 3/2007 | Ikeda et al. | |
| 7,235,330 B1 | 6/2007 | Fujimoto et al. | |
| 7,241,533 B1 | 7/2007 | Ikeda et al. | |
| 7,410,728 B1 | 8/2008 | Fujimoto et al. | |
| 7,582,383 B2 | 9/2009 | Kasai et al. | |
| 7,794,881 B1 | 9/2010 | Fujimoto et al. | |

(Continued)

FOREIGN PATENT DOCUMENTS

| EP | 1 134 826 A1 | 9/2001 |
|---|---|---|
| EP | 1 569 289 A2 | 8/2005 |

(Continued)

OTHER PUBLICATIONS

Kang et al., "Battery materials for ultrafast charging and discharging", Nature, vol. 458, Mar. 12, 2009, pp. 190-193.

(Continued)

*Primary Examiner* — Patrick Ryan
*Assistant Examiner* — Ben Lewis
(74) *Attorney, Agent, or Firm* — Nixon Peabody LLP; Jeffrey L. Costellia

(57) ABSTRACT

As a positive electrode active material, a material which is represented by the general formula $Li_{(2-x)}M1_yM2_zSiO_4$ and satisfies the conditions (I) to (IV) is used:
(I) x is a value which changes due to insertion and extraction of a lithium ion during charging and discharging, and satisfies $0 \leq x < 2$;
(II) M1 is one or more transition metal atoms selected from iron (Fe), nickel (Ni), manganese (Mn), and cobalt (Co);
(III) M2 is a metal atom that is titanium (Ti), scandium (Sc), or magnesium (Mg); and
(IV) The formulae $y+z=1$, $0<y<1$, and $0<z<1$ are satisfied. The value of $z/(y+z)$ is greater than or equal to 0.01 and less than or equal to 0.2.

18 Claims, 8 Drawing Sheets

(56) References Cited

U.S. PATENT DOCUMENTS

| | | |
|---|---|---|
| 7,799,301 B2 | 9/2010 | Kajiya et al. |
| 2007/0007239 A1 | 1/2007 | Lee et al. |
| 2008/0131778 A1* | 6/2008 | Watanabe et al. ............ 429/220 |
| 2008/0233478 A1 | 9/2008 | Hirose et al. |
| 2009/0214944 A1 | 8/2009 | Rojeski |
| 2011/0027655 A1 | 2/2011 | Rojeski |
| 2011/0151290 A1 | 6/2011 | Cui et al. |
| 2011/0229764 A1 | 9/2011 | Kawakami et al. |
| 2011/0269022 A1 | 11/2011 | Kawakami et al. |
| 2011/0300445 A1 | 12/2011 | Murakami et al. |
| 2012/0003538 A1 | 1/2012 | Yamakaji |

FOREIGN PATENT DOCUMENTS

| | | |
|---|---|---|
| JP | 2001-210315 | 8/2001 |
| JP | 2001-266882 | 9/2001 |
| JP | 2002-083594 | 3/2002 |
| JP | 2002-237294 | 8/2002 |
| JP | 2003-246700 | 9/2003 |
| JP | 2004-281317 | 10/2004 |
| JP | 2008-512838 | 4/2008 |
| JP | 2008-257894 | 10/2008 |
| JP | 2008-270154 | 11/2008 |
| JP | 2009-289586 | 12/2009 |
| WO | WO-2006/028316 A1 | 3/2006 |
| WO | WO 2006-049001 A1 | 5/2006 |
| WO | WO-2006/049001 A1 | 5/2006 |
| WO | WO-2009/108731 A2 | 9/2009 |

OTHER PUBLICATIONS

Kang.B et al., "Battery Materials for Ultrafast Charging and Discharging,", Nature, Mar. 12, 2009, vol. 458, No. 12, pp. 190-193.

Kamins.T et al., "Ti-catalyzed Si nanowires by chemical vapor deposition: Microscopy and growth mechanisms,", J. Appl. Phys. (Journal of Applied Physics), Jan. 15, 2001, vol. 89, No. 2, pp. 1008-1016.

Kohno.H et al., "Silicon Nanoneedles Grown by a Simple Thermal Treatment Using Metal-Sulfur Catalysts,", Jpn. J. Appl. Phys. (Japanese Journal of Applied Physics), Feb. 1, 2002, vol. 41, No. 2A, pp. 577-578.

Cui.L et al., "Crystalline-Amorphous Core-Shell Silicon Nanowires for High Capacity and High Current Battery Electrodes,", Nano Letters, 2009, vol. 9, No. 1, pp. 491-495.

Yasutomi.M et al., "Synthesis and Electrochemical Properties of Li2-$x$M(SiO4)1-$x$(PO4)$x$(M=Fe,Mn) Positive Active Materials by Hydrothermal Process for Li-ion Cells,", GS Yuasa Technical Report, Jun. 26, 2009, vol. 6, No. 1, pp. 21-26, GS Yuasa Corporation.

* cited by examiner

POSITIVE ELECTRODE ACTIVE MATERIAL OF POWER STORAGE DEVICE, POSITIVE ELECTRODE OF POWER STORAGE DEVICE, POWER STORAGE DEVICE, MANUFACTURING METHOD OF POSITIVE ELECTRODE ACTIVE MATERIAL OF POWER STORAGE DEVICE

BACKGROUND OF THE INVENTION

1. Field of the Invention

The technical field of the present invention relates to a power storage device and a manufacturing method thereof.

2. Description of the Related Art

With an increase in concern for the environmental issues, power storage devices used for power supply for hybrid vehicles, such as secondary batteries and electric double layer capacitors, have been actively developed. As the power storage devices, a lithium-ion secondary battery and a lithium ion capacitor which have high energy performance have attracted attention. The lithium-ion secondary battery, which is compact but can store large electricity has been already mounted on a portable information terminal such as a mobile phone or a notebook personal computer, and has helped miniaturization of products.

The secondary battery and the electric double layer capacitor have a basic structure in which an electrolyte is provided between a positive electrode and a negative electrode. It is known that each of the positive electrode and the negative electrode includes a current collector and an active material provided over the current collector. For example, in a lithium-ion secondary battery, a material capable of insertion and extraction of lithium ions is used as an active material.

Various approaches to improve the characteristics of a power storage device have been taken. For example, study of a positive electrode active material is one of the approaches to improve the characteristics of a power storage device (for example, see Patent Document 1).

[Reference]

[Patent Document]

[Patent Document 1] International Publication WO 2006/049001 Pamphlet

An object of one embodiment of the present invention is to provide a positive electrode active material that improves the characteristics of a power storage device. Another object of one embodiment of the present invention is to provide a manufacturing method of the positive electrode active material that improves the characteristics of a power storage device.

Another object of one embodiment of the present invention is to provide a power storage device whose characteristics are improved. Another object of one embodiment of the present invention is to provide a manufacturing method of the power storage device whose characteristics are improved.

SUMMARY OF THE INVENTION

In one embodiment of the disclosed invention, a lithium oxide is used as a positive electrode active material of a power storage device.

According to one embodiment of the disclosed invention, a material which is represented by the general formula $Li_{(2-x)}M1_yM2_zSiO_4$ and satisfies the following conditions (I) to (IV) is used as a positive electrode active material of a power storage device.

(I) x is a value which changes due to insertion and extraction of a lithium ion during charging and discharging, and satisfies $0 \le x < 2$ (x is greater than or equal to 0 and less than 2), preferably $0 \le x \le 2$ (x is greater than or equal to 0 and less than or equal to 2).

(II) M1 is one or more transition metal atoms selected from iron (Fe), nickel (Ni), manganese (Mn), and cobalt (Co).

(III) M2 is a metal atom that is titanium (Ti), scandium (Sc), or magnesium (Mg).

(IV) The formulae $y+z=1$, $0<y<1$, and $0<z<1$ are satisfied. The value of $z/(y+z)$ is greater than or equal to 0.01 and less than or equal to 0.2.

In a material represented by the general formula $Li_{(2-x)}M1_yM2_zSiO_4$, the highest ratio of lithium atoms to the other metal atoms (a metal M1 atom and a metal M2 atom) is 2:1 (molar ratio). Therefore, the largest number of lithium ions (a reactive material) which can be inserted and extracted can be two per one composition. Such a material is used as a positive electrode active material, whereby higher capacitance can be obtained and the characteristics of a power storage device can be improved.

According to one embodiment of the disclosed invention, in a positive electrode of a power storage device, the grain size of a positive electrode active material is nano-sized (specifically, 10 nm or more and 500 nm or less), so that a diffusion path of lithium ions (a reactive material) can be increased.

According to one embodiment of the disclosed invention, in a positive electrode of a power storage device, a surface area per unit mass of a positive material active material is increased as much as possible, so that a diffusion path of lithium ions (a reactive material) is increased. Note that the surface area per unit mass of the active material is increased due to an increase in surface roughness of the active material when small-sized grains aggregate.

According to one embodiment of the disclosed invention, a material used for a positive electrode active material contains the metal M2 atom, so that the crystal structure of the material can be distorted. As a result, under the same conditions (specifically, under the same conditions at relatively low temperature), a material which has a different crystal structure from a material that does not contain the metal M2 atom can be manufactured. Note that the ionic radius of the metal M2 atom is preferably smaller than the ionic radius of the metal M1 atom. Further, it is preferable that the ionic radius of the metal M2 atom do not greatly differ from the ionic radius of the metal M1 atom. For example, the ionic radius of the metal M2 atom is preferably more than or equal to 0.5 times and less than or equal to 2 times as large as the ionic radius of the metal M1 atom. A material other than titanium (Ti), scandium (Sc), and magnesium (Mg) described above can also be used as the metal M2 atom as long as the material satisfies such conditions.

According to one embodiment of the disclosed invention, a material used as a positive electrode active material includes the metal M2 atom, so that the electrical conductivity of the positive electrode active material can be increased.

One embodiment of the disclosed invention is a manufacturing method of a positive electrode active material of a power storage device, including the steps of: mixing a material for introducing lithium, a material for introducing metal M1, a material for introducing metal M2, and a material for introducing silicic acid; and baking the mixed materials. The method satisfies conditions (X) to (XII).

(X) M1 is one or more transition metal atoms selected from iron (Fe), nickel (Ni), manganese (Mn), and cobalt (Co).

(XI) M2 is a metal atom that is titanium (Ti), scandium (Sc), or magnesium (Mg).

(XII) The molar ratio of the metal M2 atoms to the sum of the metal M1 atoms and the metal M2 atoms in the mixed materials is greater than or equal to 0.01 and less than or equal to 0.2.

According to one embodiment of the disclosed invention, addition of a material for introducing metal M2 in the manufacturing of a positive electrode active material can promote reaction at baking. As a result, the baking time, the baking temperature, and the frequency of baking can be reduced. A residue of the raw material or a residue of an intermediate after the baking can also be reduced. Further, power consumption in the manufacturing the positive electrode active material can be reduced, leading to productivity improvement. Furthermore, the shortening of baking time or the like can suppress an increase in grain size accompanied with an increase in baking time or the like; thus, microparticulation of a material can be achieved.

One embodiment of the present invention is a positive electrode active material of a power storage device represented by the general formula $Li_{(2-x)}M1_yM2_zSiO_4$ and satisfies the following conditions (I) to (IV).

(I) x is a value which changes due to insertion and extraction of a lithium ion during charging and discharging, and satisfies $0 \leq x \leq 2$ (x is greater than or equal to 0 and less than 2), preferably $0 \leq x \leq 2$ (x is greater than or equal to 0 and less than or equal to 2).

(II) M1 is one or more transition metal atoms selected from iron (Fe), nickel (Ni), manganese (Mn), and cobalt (Co).

(III) M2 is a metal atom that is titanium (Ti), scandium (Sc), or magnesium (Mg).

(IV) The formulae $y+z=1$, $0<y<1$, and $0<z<1$ are satisfied. The value of $z/(y+z)$ is greater than or equal to 0.01 and less than or equal to 0.2.

In the above structure, the positive electrode active material of a power storage device can further satisfy at least one of conditions (V) and (VI).

(V) The positive electrode active material has a crystal structure belongs to the space group P121/n1.

(VI) The positive electrode active material has a crystal structure belongs to the space group Pmn21.

Another embodiment of the present invention is a positive electrode active material of a power storage device, in which the positive electrode active material is represented by a general formula $Li_{(2-x)}(Fe_sMn_t)_yM2_zSiO_4$ and satisfies conditions (I), (III), (IV), and (VII).

(I) x is a value which changes due to insertion and extraction of a lithium ion during charging and discharging, and satisfies $0 \leq x \leq 2$ (x is greater than or equal to 0 and less than 2), preferably $0 \leq x \leq 2$ (x is greater than or equal to 0 and less than or equal to 2).

(III) M2 is a metal atom that is titanium (Ti), scandium (Sc), or magnesium (Mg).

(IV) The formulae $y+z=1$, $0<y<1$, and $0<z<1$ are satisfied. The value of $z/(y+z)$ is greater than or equal to 0.01 and less than or equal to 0.2.

(VII) The formulae $s+t=1$, $0 \leq s \leq 1$ (s is greater than or equal to 0 and less than or equal to 1), and $0 \leq t \leq 1$ (t is greater than or equal to 0 and less than or equal to 1) are satisfied.

Another embodiment of the present invention is a positive electrode active material of a power storage device, in which the positive electrode active material is represented by a general formula $Li_{(2-x)}(Fe_sNi_u)_yM2_zSiO_4$ and satisfies conditions (I), (III), (IV), and (VIII).

(I) x is a value which changes due to insertion and extraction of a lithium ion during charging and discharging, and satisfies $0 \leq x \leq 2$ (x is greater than or equal to 0 and less than 2), preferably $0 \leq x \leq 2$ (x is greater than or equal to 0 and less than or equal to 2).

(III) M2 is a metal atom that is titanium (Ti), scandium (Sc), or magnesium (Mg).

(IV) The formulae $y+z=1$, $0<y<1$, and $0<z<1$ are satisfied. The value of $z/(y+z)$ is greater than or equal to 0.01 and less than or equal to 0.2.

(VIII) The formulae $s+u=1$, $0 \leq s \leq 1$ (s is greater than or equal to 0 and less than or equal to 1), and $0 \leq u \leq 1$ (u is greater than or equal to 0 and less than or equal to 1) are satisfied.

Another embodiment of the present invention is a positive electrode active material of a power storage device, in which the positive electrode active material is represented by a general formula $Li_{(2-x)}(Fe_sMn_tNi_u)_yM2_zSiO_4$ and satisfies conditions (I), (III), (IV), and (IX).

(I) x is a value which changes due to insertion and extraction of a lithium ion during charging and discharging, and satisfies $0 \leq x \leq 2$ (x is greater than or equal to 0 and less than 2), preferably $0 \leq x \leq 2$ (x is greater than or equal to 0 and less than or equal to 2).

(III) M2 is a metal atom that is titanium (Ti), scandium (Sc), or magnesium (Mg).

(IV) The formulae $y+z=1$, $0<y<1$, and $0<z<1$ are satisfied. The value of $z/(y+z)$ is greater than or equal to 0.01 and less than or equal to 0.2.

(IX) The formulae $s+t+u=1$, $0 \leq s \leq 1$ (s is greater than or equal to 0 and less than or equal to 1), $0 \leq t \leq 1$ (t is greater than or equal to 0 and less than or equal to 1), and $0 \leq u \leq 1$ (u is greater than or equal to 0 and less than or equal to 1) are satisfied.

Another embodiment of the present invention is a positive electrode of a power storage device including the above-described positive electrode active material of a power storage device; and a collector.

Another embodiment of the present invention is a power storage device including the above-described positive electrode of a power storage device.

Note that in this specification, in an active material, insertion and extraction of lithium ions (a reactive material) is performed during charging and discharging. Therefore, in the general formula $Li_{(2-x)}M1_yM2_zSiO_4$, the general formula $Li_{(2-x)}(Fe_sMn_t)_yM2_zSiO_4$, the general formula $Li_{(2-x)}(Fe_sNi_u)_yM2_zSiO_4$, and the general formula $Li_{(2-x)}(Fe_sMn_tNi_u)_yM2_zSiO_4$, x is a given value in the range of greater than or equal to 0 and less than or equal to 2. The active material has a distribution of a lithium concentration in some cases.

Another embodiment of the present invention is a manufacturing method of a positive electrode active material of a power storage device, including the steps of: mixing a material for introducing lithium, a material for introducing metal M1, a material for introducing metal M2, and a material for introducing silicic acid; and baking the mixed materials. The method satisfies conditions (X) to (XII).

(X) M1 is one or more transition metal atoms selected from iron (Fe), nickel (Ni), manganese (Mn), and cobalt (Co).

(XI) M2 is a metal atom that is titanium (Ti), scandium (Sc), or magnesium (Mg).

(XII) The molar ratio of the metal M2 atoms to the sum of the metal M1 atoms and the metal M2 atoms in the mixed materials is greater than or equal to 0.01 and less than or equal to 0.2.

In the above structure, baking is performed at a temperature higher than or equal to 800° C. and lower than or equal to 1100° C. for a time greater than or equal to 10 hours and less than or equal to 15 hours.

In the above structure, a material for introducing lithium and a material for introducing silicic acid may be the same. That is, a material for introducing lithium and silicic acid may be used.

In the above structure, the material for introducing lithium includes at least a lithium atom. The material for introducing metal M1 includes at least a metal M1 atom. The material for introducing metal M2 includes at least a metal M2 atom. The material for introducing silicic acid includes at least silicon.

In the above structure, the molar ratio of lithium atoms to the sum of the metal M1 atoms and the metal M2 atoms in the mixed materials is preferably 2 or close to 2.

Another embodiment of the present invention is a manufacturing method of a positive electrode of a power storage device including a positive electrode active material of a power storage device manufactured to have the above structure and a collector.

Another embodiment of the present invention is a manufacturing method of a power storage device provided with a positive electrode of the power storage device manufactured to have the above structure.

Note that in this specification, ordinal numbers such as "first", "second", and "third" are used in order to avoid confusion among components, and the terms do not limit the components numerically.

According to one embodiment of the present invention, a positive electrode active material capable of improving the characteristics of a power storage device can be provided. According to another embodiment of the present invention, a manufacturing method of a positive electrode active material capable of improving the characteristics of the power storage device can be provided. According to another embodiment of the present invention, a power storage device whose characteristics are improved can be provided. According to another embodiment of the present invention, a manufacturing method of the power storage device whose characteristics are improved can be provided.

DETAILED DESCRIPTION OF THE INVENTION

Figure 1:
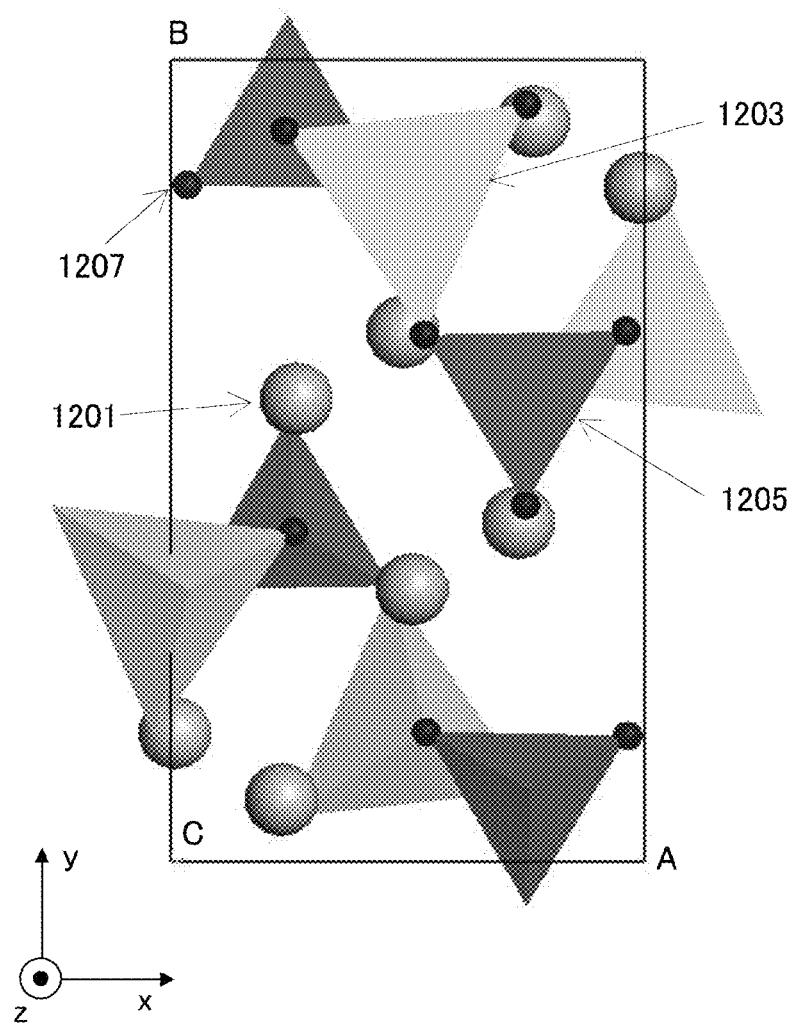
FIG. 1 is a diagram illustrating an example of a crystal structure of a space group (P121/n1) to which $Li_2Mn_yM2_zSiO_4$ belongs.

Hereinafter, embodiments and an example will be described in detail with reference to the accompanying drawings. Note that, the following embodiments and example can be embodied in many different modes, and it is easily understood by those skilled in the art that the mode and the detail can be variously changed without departing from the scope and the spirit of the present invention. Therefore, the present invention is not interpreted as being limited to the description of the embodiments and example below. In the drawings for explaining the embodiments and example, the same parts or parts having a similar function are denoted by the same reference numerals, and description of such parts is not repeated.

(Embodiment 1)

In this embodiment, a material which can be favorably used as a positive electrode active material that is one embodiment of the present invention is described.

A lithium oxide is used as the positive electrode active material that is one embodiment of the present invention. In this embodiment, an example in which silicic acid-based lithium is used as a lithium oxide is described. Detailed description thereof is given below.

A positive electrode active material according to this embodiment is represented by the general formula $Li_{(2-x)}M1_yM2_zSiO_4$ and satisfies conditions (I) to (IV) below.

(I) x is a value which changes due to insertion and extraction of a lithium ion during charging and discharging, and satisfies 0≤x<2 (x is greater than or equal to 0 and less than 2), preferably 0≤x≤2 (x is greater than or equal to 0 and less than or equal to 2).

(II) M1 is one or more transition metal atoms selected from iron (Fe), nickel (Ni), manganese (Mn), and cobalt (Co).

(III) M2 is a metal atom that is titanium (Ti), scandium (Sc), or magnesium (Mg).

(IV) The formulae y+z=1, 0<y<1, and 0<z<1 are satisfied. The value of z/(y+z) is greater than or equal to 0.01 and less than or equal to 0.2.

Note that the condition y+z=1 in (IV) may be replaced with y+z≈1 due to defects or the like.

In a material (silicic acid-based lithium) represented by the general formula $Li_{(2-x)}M1_yM2_zSiO_4$, the highest ratio of lithium atoms to the other metal atoms (the metal M1 atom and the metal M2 atom) is 2:1 (molar ratio). Therefore, when all the lithium atoms contained in the material can be used for reaction, the largest number of lithium ions (a reactive material) which can be inserted and extracted can be two per one composition. Such a material is used as a positive electrode active material, whereby higher capacitance can be obtained and the characteristics of a power storage device can be improved.

A material represented by the general formula $Li_{(2-x)}M1_yM2_zSiO_4$ can have a crystal structure belonging to a space group in which the highest ratio of lithium atoms to the other metal atoms (the metal M1 atom and the metal M2 atom) is 2:1 (molar ratio).

For example, $Li_2Mn_yM2_zSiO_4$ in which M1 is manganese and x=0 can have a crystal structure belonging to the space group P121/n1 or a crystal structure belonging to a space group Pmn21.

In FIG. 1, an example of a crystal structure of $Li_2Mn_yM2_zSiO_4$ which belongs to the space group P121/n1 is illustrated. The smallest unit of a crystal of $Li_2Mn_yM2_zSiO_4$ which belongs to the space group P121/n1 includes eight lithium atoms 1201, four of the other metal atoms (manganese atoms or the metal M2 atoms) 1203, four silicon atoms 1205, and 16 oxygen atoms 1207. As illustrated in FIG. 1, in $Li_2Mn_yM2_zSiO_4$ which belongs to the space group P121/n1, a ratio of the lithium atoms 1201 to the other metal atoms 1203 is 2:1. Thus, it is known that in theory, higher capacitance can be obtained in the case of using $Li_2Mn_yM2_zSiO_4$ which belongs to the space group P121/n1 than in the case of using a material such as $LiCoO_2$ in which a ratio of lithium atoms to the other metal atoms is 1:1.

Figure 2:
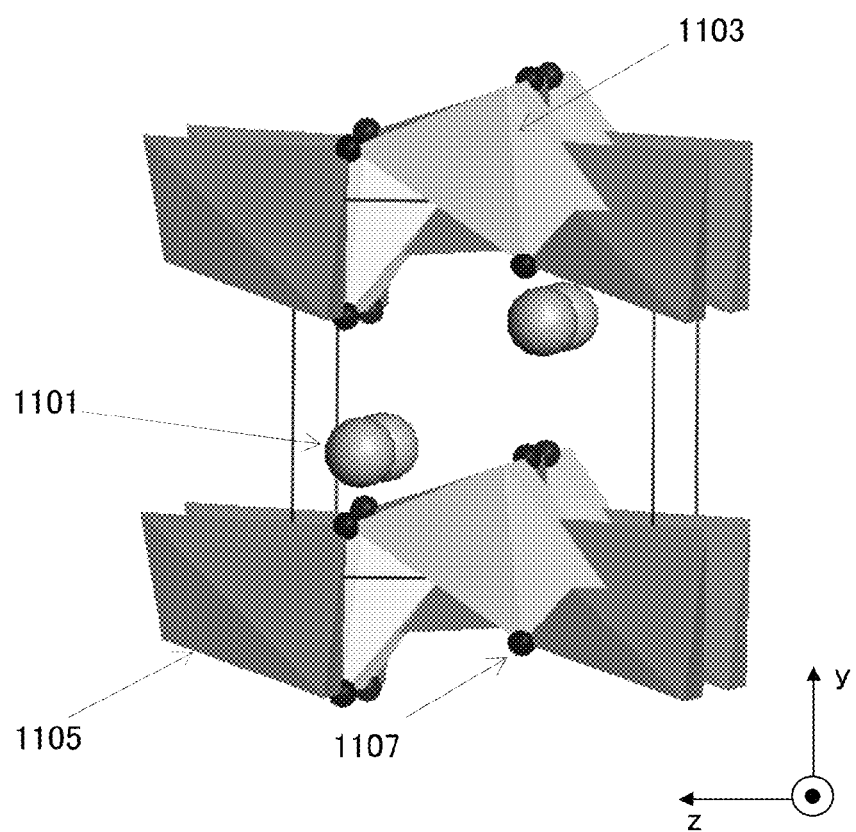
FIG. 2 is a diagram illustrating an example of a crystal structure of a space group (Pmn21) to which $Li_2Mn_yM2_zSiO_4$ belongs.

In FIG. 2, an example of a crystal structure of $Li_2Mn_yM2_zSiO_4$ which belongs to the space group Pmn21 is illustrated. The smallest unit of a crystal of $Li_2Mn_yM2_zSiO_4$ which belongs to the space group Pmn21 includes four lithium atoms 1101, two of the other metal atoms (manganese atoms or the metal M2 atoms) 1103, two silicon atoms 1105, and eight oxygen atoms 1107. As illustrated in FIG. 2, in $Li_2Mn_yM2_zSiO_4$ which belongs to the space group Pmn21, a ratio of the lithium atoms 1101 to the other metal atoms 1103 is 2:1. Thus, it can be known that in theory, higher capacitance can be obtained in the case of using $Li_2Mn_yM2_zSiO_4$ which belongs to the space group Pmn21 than in the case of using a material such as $LiCoO_2$ in which a ratio of lithium atoms to the other metal atoms is 1:1.

The space group to which a crystal structure of a material represented by the general formula $Li_{(2-x)}M1_yM2_zSiO_4$ belongs can be controlled by selecting the kinds of the metal M1 atom and the metal M2 atom, manufacturing methods, or the like. As examples of the crystal structures, a structure (V) or a structure (VI) described below is given.

(V) A crystal structure belongs to the space group P121/n1.
(VI) A crystal structure belongs to the space group Pmn21.

In a material represented by the general formula $Li_{(2-x)}M1_yM2_zSiO_4$, no matter which space group among the above ones the crystal structure belongs to, a ratio of lithium atoms to the other metal atoms is 2:1. Therefore, capacitance can be high in theory. Such a material is used as a positive electrode active material, whereby higher capacitance and the like can be obtained and the characteristics of a power storage device can be thus improved.

Note that although examples in which two kinds of elements that are the manganese atom and the metal M2 atom are introduced as metal atoms is illustrated in FIG. 1 and FIG. 2, one embodiment of the present invention is not limited thereto.

For example, as a positive electrode active material, a material which is represented by the general formula $Li_{(2-x)}(Fe_sMn_t)_yM2_zSiO_4$ and satisfies the following conditions (I), (III), (IV), and (VII) is given.

(I) x is a value which changes due to insertion and extraction of a lithium ion during charging and discharging, and satisfies $0 \leq x < 2$ (x is greater than or equal to 0 and less than 2), preferably $0 \leq x \leq 2$ (x is greater than or equal to 0 and less than or equal to 2).

(III) M2 is a metal atom that is titanium (Ti), scandium (Sc), or magnesium (Mg).

(IV) The formulae $y+z=1$, $0<y<1$, and $0<z<1$ are satisfied. The value of $z/(y+z)$ is greater than or equal to 0.01 and less than or equal to 0.2.

(VII) The formulae $s+t=1$, $0 \leq s \leq 1$ (s is greater than or equal to 0 and less than or equal to 1), and $0 \leq t \leq 1$ (t is greater than or equal to 0 and less than or equal to 1) are satisfied.

The above material (which is represented by the general formula $Li_{(2-x)}(Fe_sMn_t)_yM2_zSiO_4$) is obtained by using iron and manganese as the metal M1 atom of a material represented by the general formula $Li_{(2-x)}M1_yM2_zSiO_4$. Alternatively, nickel or cobalt may be used as the metal M1 atom.

Note that the condition $y+z=1$ in (IV) may be replaced with $y+z \approx 1$ due to defects or the like. In addition, the condition $s+t=y$ in (VII) may be replaced with $s+t \approx y$ due to defects or the like.

In addition, as a positive electrode active material, a material which is represented by the general formula $Li_{(2-x)}(Fe_sNi_u)_yM2_zSiO_4$ and satisfies the following conditions (I), (III), (IV), and (VIII) is given.

(I) x is a value which changes due to insertion and extraction of a lithium ion during charging and discharging, and satisfies $0 \leq x < 2$ (x is greater than or equal to 0 and less than 2), preferably $0 \leq x \leq 2$ (x is greater than or equal to 0 and less than or equal to 2).

(III) M2 is a metal atom that is titanium (Ti), scandium (Sc), or magnesium (Mg).

(IV) The formulae $y+z=1$, $0<y<1$, and $0<z<1$ are satisfied. The value of $z/(y+z)$ is greater than or equal to 0.01 and less than or equal to 0.2.

(VIII) The formulae $s+u=1$, $0 \leq s \leq 1$ (s is greater than or equal to 0 and less than or equal to 1), and $0 \leq u \leq 1$ (u is greater than or equal to 0 and less than or equal to 1) are satisfied.

The above material (which is represented by the general formula $Li_{(2-x)}(Fe_sNi_u)_yM2_zSiO_4$) is obtained by using iron and nickel as the metal M1 atom of a material represented by the general formula $Li_{(2-x)}M1_yM2_zSiO_4$. Alternatively, manganese or cobalt may be used as the metal M1 atom.

Note that the condition $y+z=1$ in (IV) may be replaced with $y+z \approx 1$ due to defects or the like. In addition, the condition $s+u=1$ in (VIII) may be replaced with $s+u \approx u=1$ due to defects or the like.

Further, as a positive electrode active material, a material which is represented by the general formula $Li_{(2-x)}(Fe_sMn_tNi_u)_yM2_zSiO_4$ and satisfies the following conditions (I), (III), (IV), and (IX) is given.

(I) x is a value which changes due to insertion and extraction of a lithium ion during charging and discharging, and satisfies $0 \leq x < 2$ (x is greater than or equal to 0 and less than 2), preferably $0 \leq x \leq 2$ (x is greater than or equal to 0 and less than or equal to 2).

(III) M2 is a metal atom that is titanium (Ti), scandium (Sc), or magnesium (Mg).

(IV) The formulae $y+z=1$, $0<y<1$, and $0<z<1$ are satisfied. The value of $z/(y+z)$ is greater than or equal to 0.01 and less than or equal to 0.2.

(IX) The formulae $s+t+u=1$, $0 \leq s \leq 1$ (s is greater than or equal to 0 and less than or equal to 1), $0 \leq t \leq 1$ (t is greater than or equal to 0 and less than or equal to 1), and $0 \leq u \leq 1$ (u is greater than or equal to 0 and less than or equal to 1) are satisfied.

The above material (which is represented by the general formula $Li_{(2-x)}(Fe_sMn_tNi_u)_yM2_zSiO_4$) is obtained by using iron, manganese, and nickel as the metal M1 atom of a material represented by the general formula $Li_{(2-x)}M1_yM2_zSiO_4$. Alternatively, cobalt may be used as the metal M1 atom.

Note that the condition $y+z=1$ in (IV) may be replaced with $y+z \approx 1$ due to defects or the like. In addition, the condition $s+t+u=1$ in (IX) may be replaced with $s+t+u \approx 1$ due to defects or the like.

As described above, even in the case where two or more kinds of elements are used as the metal M1 atom, the highest ratio of lithium atoms to the other metal atoms (the metal M1 atom and the metal M2 atom) is 2:1. Such a material is used as a positive electrode active material, whereby higher capacitance can be obtained and the characteristics of a power storage device can be thus improved.

This embodiment can be combined with a structure of any of the other embodiments or the example as appropriate.

(Embodiment 2)

In this embodiment, an example of a manufacturing method of silicic acid-based lithium is described.

<Manufacturing Method of $Li_2Mn_yTi_zSiO_4$>

An example of a manufacturing method in the case where the metal M1 atom is manganese and the metal M2 atom is titanium is described. Note that insertion and extraction of a lithium ion is performed during charging and discharging; therefore $Li_2Mn_yTi_zSiO_4$ after the manufacturing is expressed by $Li_{(2-x)}Mn_yTi_zSiO_4$. The formulae $y+z=1$, $0<y<1$, and $0<z<1$ are satisfied. The value of $z/(y+z)$ is greater than or equal to 0.01 and less than or equal to 0.2.

$Li_2Mn_yTi_zSiO_4$ can be manufactured with the use of a material (a raw material) for introducing lithium, a material (a raw material) for introducing manganese, a material (a raw material) for introducing titanium, and a material (a raw material) for introducing silicic acid. For example, lithium metasilicate ($Li_2SiO_3$), manganese(II) oxalate ($MnC_2O_4$), and dititanium trioxide ($Ti_2O_3$) can be used as a raw material for introducing lithium and silicic acid, a raw material for introducing manganese, and a raw material for introducing titanium, respectively. Note that the present invention is not limited to these raw materials and other materials can be used as long as lithium, manganese, titanium, and silicic acid can be introduced.

The materials (the raw materials) are mixed and then subjected to baking, so that $Li_2Mn_yTi_zSiO_4$ can be manufactured.

The mixture ratio of the materials (the raw materials) may be determined in consideration of the molar ratios in $Li_2Mn_yTi_zSiO_4$ after the manufacturing. For example, the materials are mixed so that the molar ratio of titanium atoms to the sum of manganese atoms and titanium atoms is greater than or equal to 0.01 and less than or equal to 0.2. Further, the materials are mixed so that the molar ratio of lithium atoms to the sum of manganese atoms and titanium atoms is 2.

The raw materials can be mixed by ball mill treatment, for example. By performing ball mill treatment, the raw materials can be microparticulated as well as being mixed, so that $Li_2Mn_yTi_zSiO_4$ after the manufacturing can be microparticulated. In addition, by performing the ball mill treatment, the raw materials can be uniformly mixed and the crystallinity of $Li_2Mn_yTi_zSiO_4$ after the manufacturing can be increased.

In the case of mixing the raw materials by the ball mill treatment, the raw materials, a solvent, and balls are put in an apparatus (a ball mill pot) and mixing is performed. As a solvent, acetone, ethanol, or the like can be used. Metallic balls, ceramic balls, or the like can be used. The ball mill treatment can be performed in such a manner that a ball mill with a ball diameter of greater than or equal to $\phi 1$ mm and less than or equal to $\phi 10$ mm is rotated at greater than or equal to 50 rpm and less than or equal to 500 rpm for greater than or equal to 30 minutes and less than or equal to 5 hours.

For example, lithium metasilicate, manganese(II) oxalate, and dititanium trioxide that are raw materials, acetone that is a solvent, and a ball containing zirconia (Zr) with a ball diameter of $\phi 3$ mm are put in a ball mill pot and rotation is performed at 400 rpm for 2 hours, so that a mixture of the raw materials can be formed.

Baking of the mixture of the raw materials can be performed, for example, at a baking temperature of higher than or equal to 800° C. and lower than or equal to 1100° C. for greater than or equal to one hour and less than or equal to 24 hours, preferably greater than or equal to 10 hours and less than or equal to 15 hours. This baking temperature is relatively low in the case where the metal M1 atom is manganese. The baking temperature may be higher than or equal to 1100° C. The frequency of baking may be once. Therefore, the total baking time can be shortened as compared to the case where the frequency of baking is twice or more.

Note that the mixture of the raw materials may be subjected to pressure treatment before being subjected to the baking. For example, the mixture of the raw materials can be shaped into pellets before being baked.

For example, a mixture of the raw materials (lithium metasilicate, manganese(II) oxalate ($MnC_2O_4$), and dititanium trioxide) which is formed by mixing by the ball mill treatment is heated to 50° C. so that the solvent (acetone) is evaporated; then, a pressure of 150 kgf is applied to the mixture with the use of a pellet press for 5 minutes, so that the mixture is shaped into pellets. The mixture shaped into pellets is subjected to the baking in a nitrogen atmosphere at a baking temperature of 900° C. for 10 hours. The materials are mixed so that the molar ratio of titanium atoms to the sum of manganese atoms and titanium atoms is 0.05.

In this example, by setting the baking temperature to 900° C. and using dititanium trioxide for the raw material, $Li_2Mn_yTi_zSiO_4$ having a crystal structure belonging to the space group P121/n1 can be formed.

Note that baking of the mixture of the raw materials may be divided into first baking (pre-baking) and second baking (main-baking). In that case, the second baking is preferably performed at higher temperature than in the first baking. The baking is performed twice, microparticulation of $Li_2Mn_yTi_zSiO_4$ after the manufacturing can be performed or the crystallinity thereof can be increased.

In $Li_2Mn_yTi_zSiO_4$ which is obtained in the above-described manner, the largest number of lithium ions which are inserted and extracted can be two per one composition. With use of such a material as a positive electrode active material, higher capacitance can be obtained, which can contribute to improvement in the characteristics of a power storage device.

Since the shortening of baking time or the like can be achieved, an increase in grain size accompanied with an increase in baking time or the like can be suppressed. Thus, a material used as a positive electrode active material can be microparticulated. For example, the grain size of a material used as the positive electrode active material can be nano-sized (specifically, 10 nm or more and 500 nm or less). With such small-sized grains, a surface area per unit mass of the active material can be increased. Therefore, a diffusion path of lithium ions (a reactive material) in a positive electrode of a power storage device can be increased.

Addition of a material for introducing titanium in the manufacturing of the positive electrode active material can promote reaction at baking, and thus the baking temperature can be lowered. Moreover, a residue of the raw material or a residue of an intermediate after the baking can be reduced. Therefore, power consumption in the manufacturing the positive electrode active material can be reduced, leading to productivity improvement.

A material used as the active material includes a titanium atom, so that the electrical conductivity of the positive electrode active material can be increased.

Although an example in which the metal M1 atom is manganese and the metal M2 atom is titanium is described in this embodiment, a desired material which is represented by the general formula $Li_{(2-x)}M1M2_zSiO_4$ can be manufactured by appropriately selecting a raw material for introducing the metal M1 atom and a raw material for introducing the metal M2 atom.

This embodiment can be combined with a structure of any of the other embodiments or the example as appropriate.

(Embodiment 3)

In this embodiment, an example of a power storage device including the positive electrode active material described in the above embodiment is described.

Figure 3:
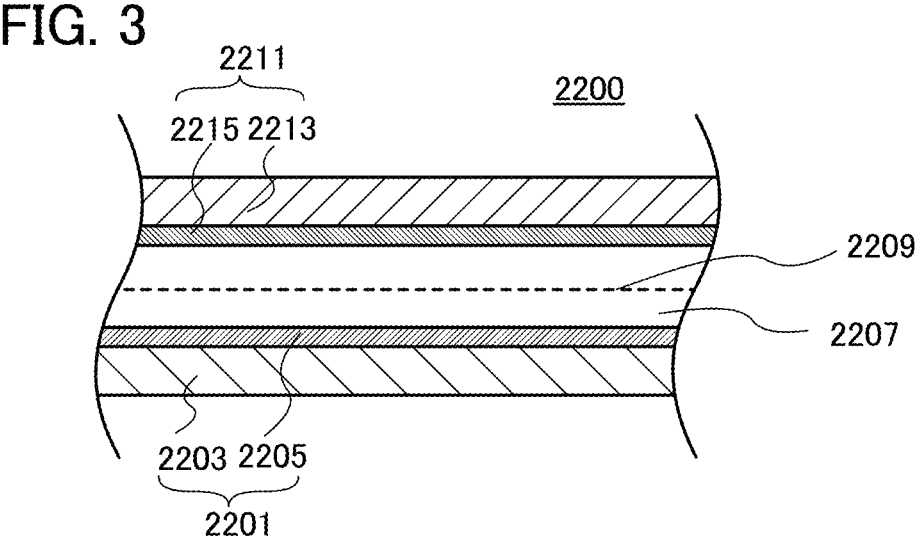
FIG. 3 is a diagram illustrating an example of a structure of a power storage device.

A part of a structure of a power storage device 2200 is illustrated in FIG. 3. The power storage device 2200 includes a positive electrode 2201 and a negative electrode 2211 which faces the positive electrode 2201 with an electrolyte 2207 provided therebetween.

The positive electrode 2201 includes a collector 2203 and a positive electrode active material layer 2205 provided over the collector 2203.

An active material (the positive electrode active material layer 2205) of the positive electrode 2201 is formed using the material which is described in the above embodiment. The above embodiment can be referred to for materials and a manufacturing method of the positive electrode active material layer 2205. As a material of the collector 2203, a conductive material such as aluminum, platinum, copper, or titanium can be used, for example.

The negative electrode 2211 includes a collector 2213 and a negative electrode active material layer 2215 provided over the collector 2213. As a material of the collector 2213, a conductive material such as platinum, copper, or titanium can be used, for example. As a material of the negative electrode active material layer 2215, a carbon material such as graphite, a lithium metal, silicon, or the like can be used.

The electrolyte 2207 has a function of transporting a reactive material (e.g., lithium ions). A material of the electrolyte 2207 can be solid or liquid.

In the case where the material of the electrolyte 2207 is solid, $Li_3PO_4$, $Li_xPO_yN_z$ (x, y, and z are positive real numbers) which is formed by mixing $Li_3PO_4$ with nitrogen, $Li_2S$—$SiS_2$, $Li_2S$—$P_2S_5$, $Li_2S$—$B_2S_3$, or the like can be used. Alternatively, any of these which are doped with LiI or the like can be used.

In the case where the material of the electrolyte 2207 is liquid, the electrolyte includes a solvent and a solute (salt) dissolved in the solvent. As the solvent, any of cyclic carbonates such as propylene carbonate and ethylene carbonate, or chain-like carbonates such as dimethyl carbonate and diethyl carbonate can be used. As the solute (salt), for example, a solute (salt) containing one or more kinds of light metal salts (e.g., lithium salt) such as $LiPF_6$, $LiBF_4$, or LiTFSA can be used.

Note that a separator 2209 is provided in the case where the electrolyte 2207 is liquid. The separator 2209 prevents contact between the positive electrode 2201 and the negative electrode 2211 and has a function of allowing passage of a reactive material (e.g., lithium ions). As a material of the separator 2209, for example, paper, nonwoven fabric, a glass fiber, a synthetic fiber such as nylon (polyamide), vinylon (a polyvinyl alcohol based fiber that is also referred to as vinalon), polypropylene, polyester, acrylic, polyolefin, or polyurethane, or the like can be used. However, a material which does not dissolve in the electrolyte 2207 should be selected. Further, the separator 2209 may be provided even when a solid electrolyte is used as the electrolyte 2207.

By applying the material described in the above embodiment to the positive electrode active material layer 2205 in the positive electrode 2201 of the power storage device 2200, a higher charging and discharging rate, higher capacitance, and the like can be obtained and the characteristics of the power storage device can be thus improved.

This embodiment can be combined with a structure of any of the other embodiments or the example as appropriate.
(Embodiment 4)

In this embodiment, application of a power storage device according to one embodiment of the present invention is described.

The power storage device can be provided in a variety of electronic devices. For example, the power storage device can be provided in cameras such as digital cameras or video cameras, mobile phones, portable information terminals, e-book terminals, portable game machines, digital photo frames, audio reproducing devices, and the like. Moreover, the power storage device can be provided in electric propulsion vehicles such as electric vehicles, hybrid vehicles, electric railway vehicles, maintenance vehicles, carts, wheelchairs, and bicycles.

The characteristics of a power storage device according to one embodiment of the present invention are improved; for example, higher capacitance and a higher charging and discharging rate are obtained. The improvement in the characteristics of the power storage device leads to reduction in size and weight of the power storage device. When being provided with such a power storage device, electronic devices or electric propulsion vehicles can have a shorter charging time, a longer operating time, and can be reduced in size and weight, and thus their convenience and design can be improved.

Figure 4A:
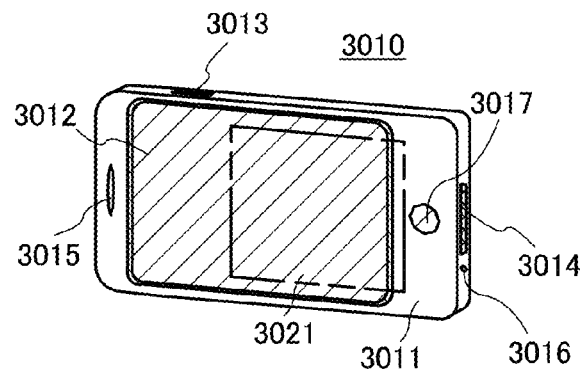
FIGS. 4A and 4B are diagrams each illustrating an example of an electronic device.

FIG. 4A illustrates an example of a mobile phone. A mobile phone 3010 includes a power storage device 3021 according to one embodiment of the present invention. In the mobile phone 3010, a display portion 3012 is incorporated in a housing 3011. The housing 3011 is provided with an operation button 3013, an operation button 3017, an external connection port 3014, a speaker 3015, a microphone 3016, and the like. The power storage device 3021 according to one embodiment of the present invention is provided in such a mobile phone, whereby the mobile phone can have improved convenience and design.

Figure 4B:
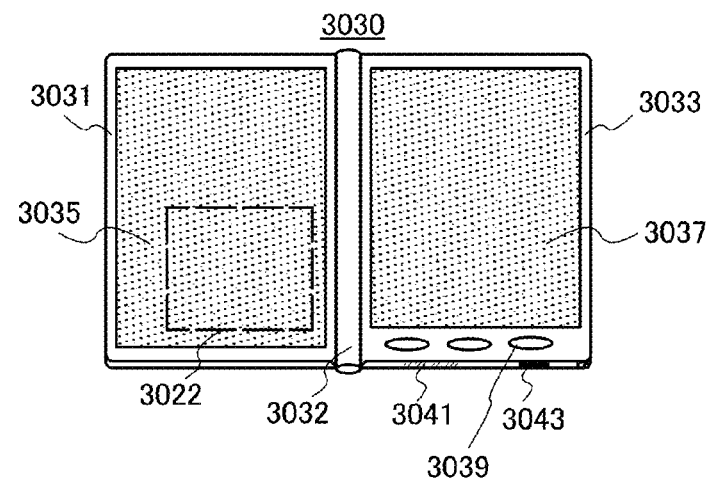

FIG. 4B illustrates an example of an e-book terminal. An e-book terminal 3030 includes a power storage device 3022 according to one embodiment of the present invention. The e-book terminal 3030 includes two housings, a first housing 3031 and a second housing 3033, which are combined with each other with a hinge 3032. The first and second housings 3031 and 3033 can be opened and closed with the hinge 3032 as an axis. A first display portion 3035 and a second display portion 3037 are incorporated in the first housing 3031 and the second housing 3033, respectively. In addition, the second housing 3033 is provided with an operation button 3039, a power switch 3043, a speaker 3041, and the like. The power storage device 3022 according to one embodiment of the present invention is provided in such an e-book terminal, whereby the e-book terminal can have improved convenience and design.

Figure 5A:
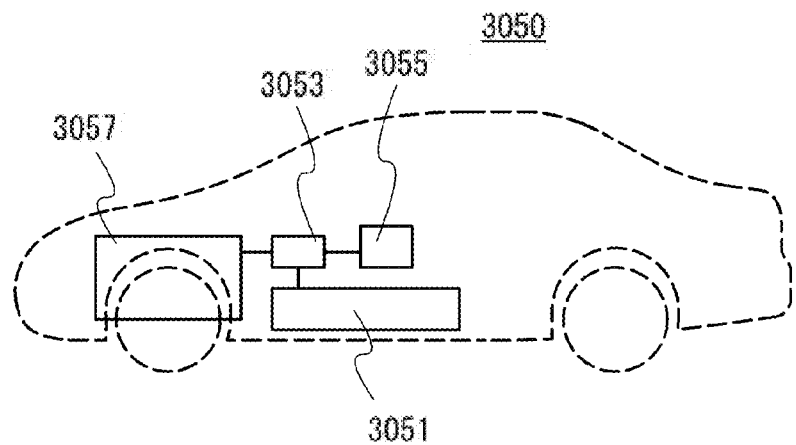
FIGS. 5A and 5B are diagrams each illustrating an example of an electric propulsion vehicle.

FIG. 5A illustrates an example of an electric vehicle. A power storage device 3051 is provided in an electric vehicle 3050. The electric power of the power storage device 3051 is controlled by a control circuit 3053 to be output and is supplied to a driving device 3057. The control circuit 3053 is controlled by a computer 3055.

The driving device 3057 includes a DC motor or an AC motor either alone or in combination with an internal-combustion engine. The computer 3055 outputs a control signal to the control circuit 3053 based on an input data such as data of operation (e.g., acceleration, deceleration, or stop) by a driver or data during driving (e.g., data on an upgrade or a downgrade, or data on a load on a driving wheel) of the electric vehicle 3050. The control circuit 3053 adjusts the electric energy supplied from the power storage device 3051 in accordance with the control signal of the computer 3055 to control the output to the driving device 3057. In the case where the AC motor is mounted, an inverter which converts direct current into alternate current is incorporated.

Charging of the power storage device 3051 can be performed by supplying power from the external by a plug-in system. When a power storage device according to one embodiment of the present invention is provided as the power storage device 3051, a shorter charging time can be brought about and improved convenience can be realized. Besides, the higher charging and discharging rate of the power storage device can contribute to greater acceleration and excellent characteristics of the electric vehicle. Further, when the power storage device 3051 can be reduced in size and weight as a result of improvement in its characteristics, the vehicle can be reduced in weight and the fuel consumption can also be reduced.

Figure 5B:
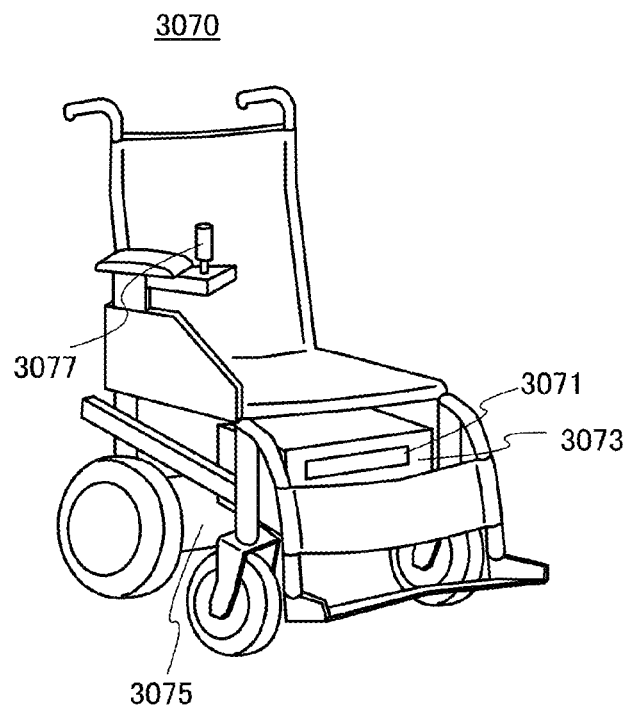

FIG. 5B illustrates an example of an electric wheelchair. A wheelchair 3070 includes a control portion 3073 which is provided with a power storage device 3071, a power controller, a control means, and the like. The electric power of the power storage device 3071 is controlled by the control portion 3073 to be output and is supplied to a driving portion 3075. Further, the control portion 3073 is connected to a controller 3077. By operation of the controller 3077, the driving portion 3075 can be driven via the control portion 3073 and movement of the wheelchair 3070 such as moving forward/backward and a turn and speed can be controlled.

Charging of the power storage device 3071 of the wheelchair 3070 can also be performed by supplying power from the external by a plug-in system. When a power storage device according to one embodiment of the present invention is provided as the power storage device 3071 of the control portion 3073, a shorter charging time can be brought about and improved convenience can be realized. Further, the power storage device 3071 can be reduced in size and weight as a result of improvement in its characteristics, whereby the user and the wheelchair helper can use the wheelchair 3070 more easily.

Note that in the case where a power storage device is provided in electric railway vehicles as electric propulsion vehicles, charging of the power storage device can be performed by supplying power from an overhead cable or a conductor rail.

This embodiment can be combined with a structure of any of the other embodiments or the example as appropriate.

(Embodiment 5)

In this embodiment, an example in which a secondary battery that is an example of the power storage device according to one embodiment of the present invention is used in a wireless power feeding system (hereinafter referred to as an RF power feeding system) is described with reference to block diagrams in FIG. 6 and FIG. 7. In each of the block diagrams, independent blocks show elements within a power receiving device and a power feeding device, which are classified according to their functions. However, it may be practically difficult to completely separate the elements according to their functions; in some cases, one element can involve a plurality of functions.

First, the RF power feeding system is described with reference to FIG. 6.

A power receiving device 600 is an electronic device or an electric propulsion vehicle which is driven by electric power supplied from a power feeding device 700, and can be applied to another device which is driven by electric power, as appropriate. Typical examples of the electronic devices include cameras such as digital cameras or video cameras, digital photo frames, mobile phones (also referred to as cellular phones or cellular phone devices), portable game machines, portable information terminals, audio reproducing devices, display devices, and computers. Typical examples of the electric propulsion vehicles include electric vehicles, hybrid electric vehicles, electric railway vehicles, maintenance vehicles, carts, and electric wheelchairs. In addition, the power feeding device 700 has a function of supplying electric power to the power receiving device 600.

Figure 6:
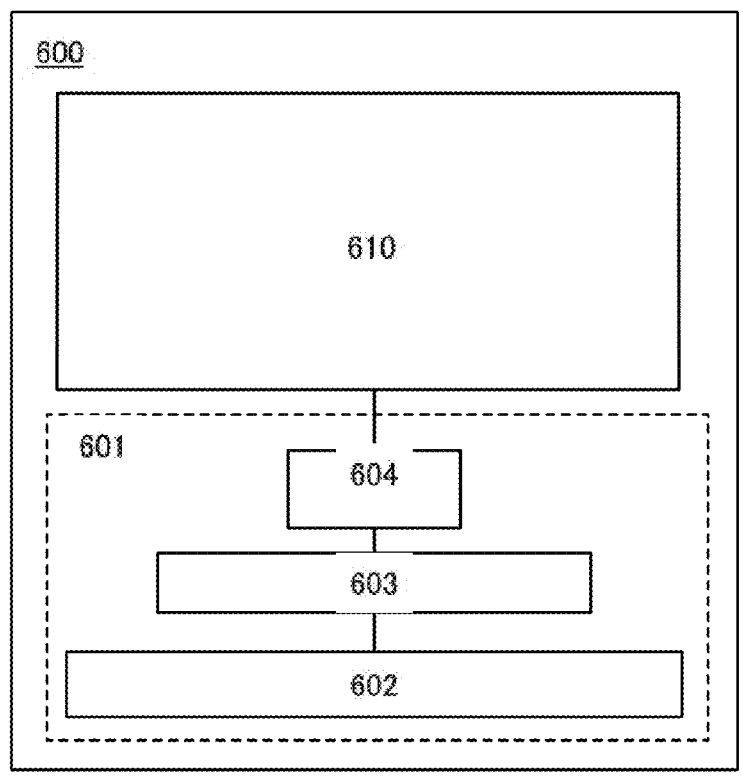
FIG. 6 is a diagram showing a configuration of a wireless power feeding system.
Figure 6:
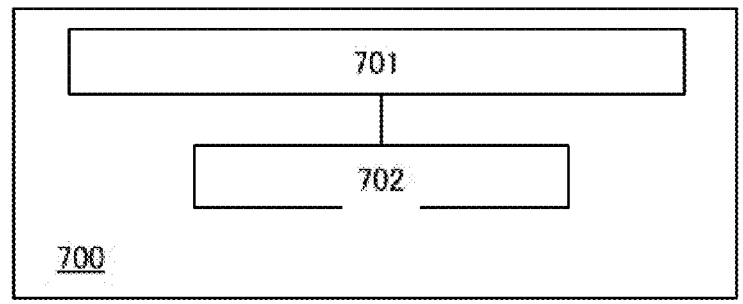

In FIG. 6, the power receiving device 600 includes a power receiving device portion 601 and a power load portion 610. The power receiving device portion 601 includes at least a power receiving device antenna circuit 602, a signal processing circuit 603, and a secondary battery 604. The power feeding device 700 includes at least a power feeding device antenna circuit 701 and a signal processing circuit 702.

The power receiving device antenna circuit 602 has a function of receiving a signal transmitted by the power feeding device antenna circuit 701 or transmitting a signal to the power feeding device antenna circuit 701. The signal processing circuit 603 processes a signal received by the power receiving device antenna circuit 602 and controls charging of the secondary battery 604 and supplying of electric power from the secondary battery 604 to the power load portion 610. In addition, the signal processing circuit 603 controls operation of the power receiving device antenna circuit 602. That is, the signal processing circuit 603 can control the intensity, the frequency, or the like of a signal transmitted by the power receiving device antenna circuit 602. The power load portion 610 is a driving portion which receives electric power from the secondary battery 604 and drives the power receiving device 600. Typical examples of the power load portion 610 include a motor, and a driving circuit. Another device which drives the power receiving device by receiving electric power can be used as the power load portion 610 as appropriate. The power feeding device antenna circuit 701 has a function of transmitting a signal to the power receiving device antenna circuit 602 or receiving a signal from the power receiving device antenna circuit 602. The signal processing circuit 702 processes a signal received by the power feeding device antenna circuit 701. In addition, the signal processing circuit 702 controls operation of the power feeding device antenna circuit 701. That is, the signal processing circuit 702 can control the intensity, the frequency, or the like of a signal transmitted by the power feeding device antenna circuit 701.

The secondary battery according to one embodiment of the present invention is used as the secondary battery 604 included in the power receiving device 600 in the RF power feeding system illustrated in FIG. 6.

With the use of the secondary battery according to one embodiment of the present invention in the RF power feeding system, the amount of discharge capacitance or the amount of charge capacitance (also referred to as the amount of power storage) can be larger than that in a conventional secondary battery. Therefore, the time interval of the wireless power feeding can be longer (frequent power feeding can be omitted).

In addition, with the use of the secondary battery according to one embodiment of the present invention in the RF power feeding system, the power receiving device 600 can be formed to be compact and lightweight when the amount of discharge capacitance or the amount of charge capacitance with which the power load portion 610 can be driven is the same as that in a conventional power storage device. Therefore, the total cost can be reduced.

Next, another example of the RF power feeding system is described with reference to FIG. 7.

Figure 7:
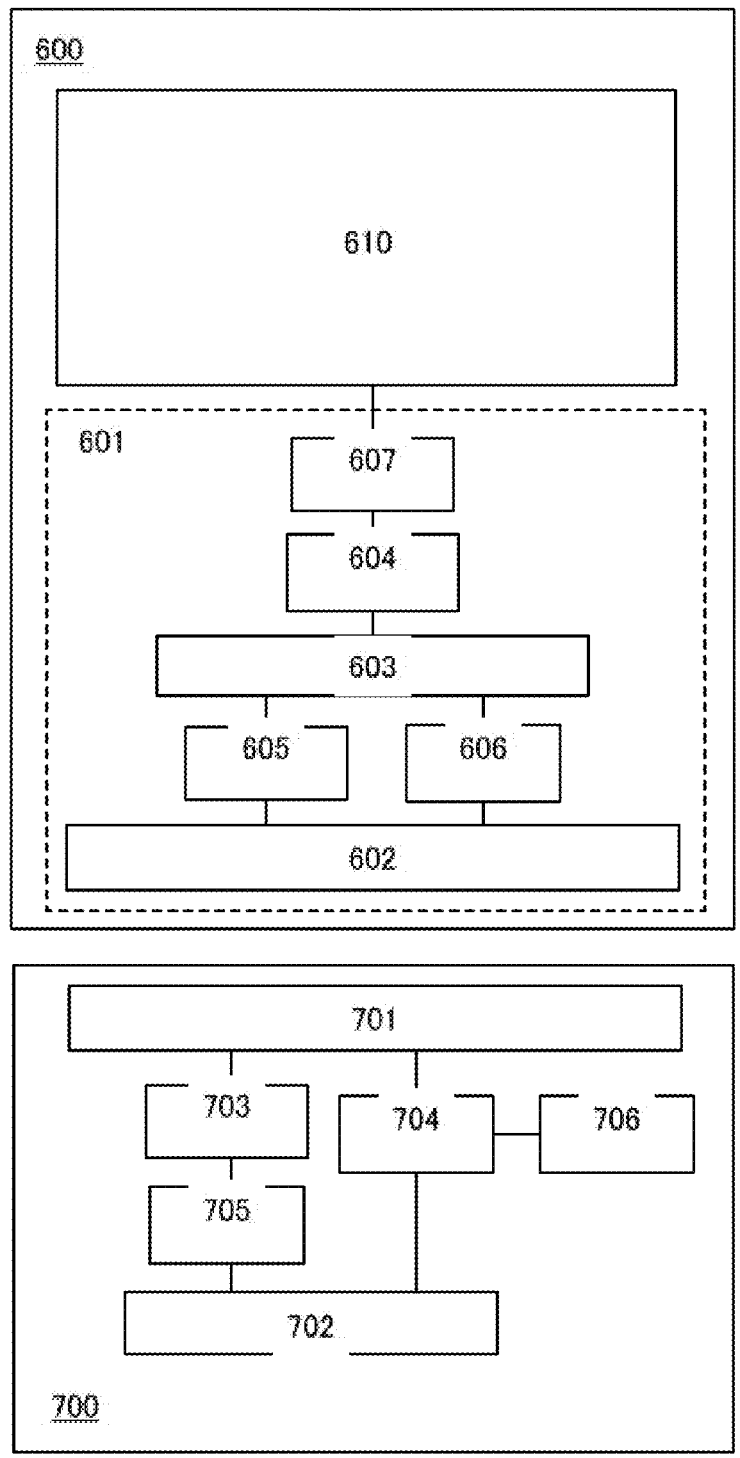
FIG. 7 is a diagram showing a configuration of a wireless power feeding system.

In FIG. 7, the power receiving device 600 includes the power receiving device portion 601 and the power load portion 610. The power receiving device portion 601 includes at least the power receiving device antenna circuit 602, the signal processing circuit 603, the secondary battery 604, a rectifier circuit 605, a modulation circuit 606, and a power supply circuit 607. The power feeding device 700 includes at least the power feeding device antenna circuit 701, the signal processing circuit 702, a rectifier circuit 703, a modulation circuit 704, a demodulation circuit 705, and an oscillator circuit 706.

The power receiving device antenna circuit 602 has a function of receiving a signal transmitted by the power feeding device antenna circuit 701 or transmitting a signal to the power feeding device antenna circuit 701. When the power receiving device antenna circuit 602 receives a signal transmitted by the power feeding device antenna circuit 701, the rectifier circuit 605 has a function of generating DC voltage from the signal received by the power receiving device antenna circuit 602. The signal processing circuit 603 has a function of processing a signal received by the power receiving device antenna circuit 602 and controlling charging of the secondary battery 604 and supplying of electric power from the secondary battery 604 to the power supply circuit 607. The power supply circuit 607 has a function of converting voltage stored by the secondary battery 604 into voltage needed for the power load portion 610. The modulation circuit 606 is used to transmit a certain response from the power receiving device 600 to the power feeding device 700.

With the power supply circuit 607, electric power supplied to the power load portion 610 can be controlled. Thus, overvoltage application to the power load portion 610 can be suppressed, and deterioration or breakdown of the power receiving device 600 can be reduced.

In addition, with the modulation circuit 606, a signal can be transmitted from the power receiving device 600 to the power feeding device 700. Therefore, when the amount of charged power in the power receiving device 600 is judged to reach a certain amount, a signal is transmitted from the power receiving device 600 to the power feeding device 700 so that power feeding from the power feeding device 700 to the power receiving device 600 can be stopped. As a result, the secondary battery 604 is not fully charged, so that the number of charge times of the secondary battery 604 can be increased.

The power feeding device antenna circuit 701 has a function of transmitting a signal to the power receiving device antenna circuit 602 or receiving a signal from the power receiving device antenna circuit 602. When a signal is transmitted to the power receiving device antenna circuit 602, the signal processing circuit 702 generates a signal which is transmitted to the power receiving device. The oscillator circuit 706 is a circuit which generates a signal with a constant frequency. The modulation circuit 704 has a function of applying voltage to the power feeding device antenna circuit 701 in accordance with the signal generated by the signal processing circuit 702 and the signal with a constant frequency generated by the oscillator circuit 706. Thus, a signal is output from the power feeding device antenna circuit 701. On the other hand, when reception of a signal from the power receiving device antenna circuit 602 is performed, the rectifier circuit 703 has a function of rectifying the received signal. From signals rectified by the rectifier circuit 703, the demodulation circuit 705 extracts a signal transmitted from the power receiving device 600 to the power feeding device 700. The signal processing circuit 702 has a function of analyzing the signal extracted by the demodulation circuit 705.

Note that any circuit may be provided between circuits as long as the RF power feeding can be performed. For example, after the power receiving device 600 receives a signal and the rectifier circuit 605 generates DC voltage, a circuit such as a DC-DC converter or regulator that is provided in a subsequent stage may generate constant voltage. Thus, overvoltage application to the inside of the power receiving device 600 can be suppressed.

A secondary battery according to one embodiment of the present invention is used as the secondary battery 604 included in the power receiving device 600 in the RF power feeding system illustrated in FIG. 7.

With the use of the secondary battery according to one embodiment of the present invention in the RF power feeding system, the amount of discharge capacitance or the amount of charge capacitance can be larger than that in a conventional secondary battery. Therefore, the time interval of the wireless power feeding can be longer (frequent power feeding can be omitted).

In addition, with the use of the secondary battery according to one embodiment of the present invention in the RF power feeding system, the power receiving device 600 can be formed to be compact and lightweight when the amount of discharge capacitance or the amount of charge capacitance with which the power load portion 610 can be driven is the same as that in a conventional secondary battery. Therefore, the total cost can be reduced.

Note that when the secondary battery according to one embodiment of the present invention is used in the RF power feeding system and the power receiving device antenna circuit 602 and the secondary battery 604 are overlapped with each other, it is preferable that the impedance of the power receiving device antenna circuit 602 is not changed by deformation of the secondary battery 604 due to charge and discharge of the secondary battery 604 and deformation of an antenna due to the above deformation. When the impedance of the antenna is changed, in some cases, electric power is not supplied sufficiently. For example, the secondary battery 604 may be placed in a battery pack formed using metal or ceramics. Note that in that case, the power receiving device antenna circuit 602 and the battery pack are preferably separated from each other by several tens of micrometers or more.

In this embodiment, the charging signal has no limitation on its frequency and may have any band of frequency as long as electric power can be transmitted. For example, the charging signal may have any of an LF band (long wave) of 135 kHz, an HF band (short wave) of 13.56 MHz, a UHF band (ultra high frequency wave) of 900 MHz to 1 GHz, and a microwave band of 2.45 GHz.

A signal transmission method may be properly selected from various methods such as an electromagnetic coupling method, an electromagnetic induction method, a resonance method, and a microwave method. In order to prevent energy loss due to foreign substances containing moisture, such as rain and mud, the electromagnetic induction method or the resonance method using a low frequency band, specifically, very-low frequencies of 3 kHz to 30 kHz, low frequencies of 30 kHz to 300 kHz, medium frequencies of 300 kHz to 3 MHz, or high frequencies of 3 MHz to 30 MHz is preferably used.

This embodiment can be combined with a structure of any of the other embodiments or the example as appropriate.

EXAMPLE 1

In this example, manufacturing of silicic acid-based lithium as a lithium oxide and X-ray diffraction measurement results thereof are described.

First, a manufacturing method of the measured silicic acid-based lithium is described.

Lithium metasilicate ($Li_2SiO_3$), manganese(II) oxalate ($MnC_2O_4$), and dititanium trioxide ($Ti_2O_3$) were used as materials for silicic acid-based lithium, and mixed by ball mill treatment.

The ball mill treatment was performed in such a manner that acetone was added as a solvent, and a ball mill with a ball diameter of 3 mm was rotated at 400 rpm for 2 hours.

After the ball mill treatment, the mixture of the raw materials was taken out of a pot and heated to 50° C., so that acetone was evaporated. Then, a pressure of 1.47×10² N (150 kgf) was applied to the mixture of the raw materials with use of a pellet press for 5 minutes, so that the mixture of the raw materials was shaped into pellets.

Then, the mixture which was shaped into pellets was subjected to baking. The baking was performed in a nitrogen atmosphere at 900° C. for 10 hours.

Figure 8A:
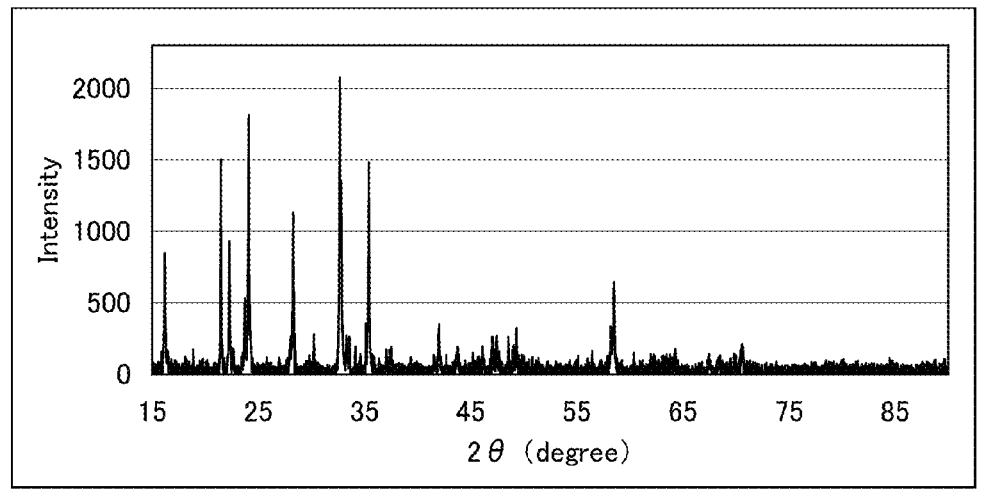
FIGS. 8A and 8B are graphs each showing a measurement result of X-ray diffraction.

Then, X-ray diffraction (XRD) measurement was performed on the manufactured silicic acid-based lithium. The XRD measurement result is shown in FIG. 8A. From the result shown in FIG. 8A, it was confirmed that the manufactured silicic acid-based lithium had a crystal structure belonging to the space group P121/n1. In addition, from the result shown in FIG. 8A, a peak near a point of 2θ=40, which is considered as a peak of manganese oxide that is a residue of an intermediate, was not confirmed.

As described above, it was confirmed that silicic acid-based lithium whose crystal structure belongs to the space group P121/n1 can be manufactured. After that, heat treatment was further performed, and it was confirmed that silicic acid-based lithium whose crystal structure belongs to the space group Pmn21 can be manufactured. Accordingly, it was confirmed that silicic acid-based lithium whose crystal structure belongs to the space group P121/n1 and silicic acid-based lithium whose crystal structure belongs to the space group Pmn21 can be separately manufactured.

COMPARATIVE EXAMPLE

Figure 8B:
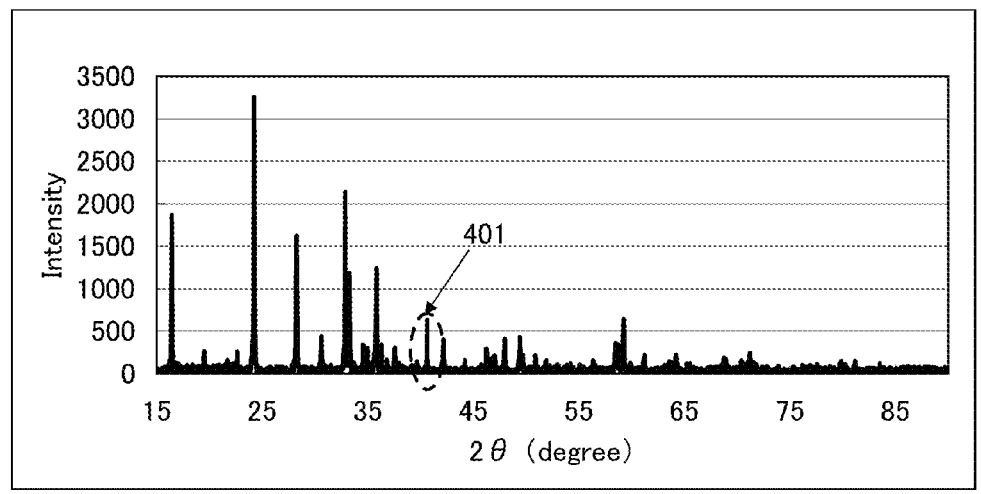

FIG. 8B shows a result of X-ray diffraction measurement performed on silicic acid-based lithium which was manufactured without adding dititanium trioxide ($Ti_2O_3$). The result in FIG. 8B shows a peak 401 near a point of 2θ=40 which is considered as a peak of manganese oxide that is a residue of an intermediate.

This application is based on Japanese Patent Application serial no. 2010-151440 filed with Japan Patent Office on Jul. 1, 2010, the entire contents of which are hereby incorporated by reference.

What is claimed is:

1. A positive electrode active material of a power storage device,
   wherein the positive electrode active material is represented by a general formula $Li_{(2-x)}M1_yM2_zSiO_4$ and satisfies conditions (I) to (IV):
   (I) x satisfies 0≤x<2 (x is greater than or equal to 0 and less than 2);
   (II) M1 is one or more metal atoms selected from iron (Fe), nickel (Ni), manganese (Mn), and cobalt (Co);
   (III) M2 is a metal atom that is titanium (Ti), scandium (Sc), or magnesium (Mg); and
   (IV) Formulae y+z≈1, 0<y<1, and 0<z<1 are satisfied, and also the value of z/(y+z) is greater than or equal to 0.01 and less than or equal to 0.2, and
   wherein the positive electrode active material satisfies at least one of conditions (V) and (VI):
   (V) The positive electrode active material has a crystal structure belongs to the space group P121/n1; and
   (VI) The positive electrode active material has a crystal structure belongs to the space group Pmn21.

2. The positive electrode active material of a power storage device according to claim 1, wherein x satisfies 0≤x≤2 (x is greater than or equal to 0 and less than or equal to 2).

3. The positive electrode active material of a power storage device according to claim 1, wherein Formula y+z=1 is satisfied.

4. A power storage device comprising a positive electrode of a power storage device, the positive electrode comprising:
   the positive electrode active material of a power storage device according to claim 1; and
   a collector.

5. A positive electrode active material of a power storage device, wherein the positive electrode active material is represented by a general formula $Li_{(2-x)}(Fe_sMn_t)_yM2_zSiO_4$ and satisfies conditions (I), (III), (IV), and (VII):
   (I) x satisfies 0≤x<2 (x is greater than or equal to 0 and less than 2);
   (III) M2 is a metal atom that is titanium (Ti), scandium (Sc), or magnesium (Mg);
   (IV) Formulae y+z≈1, 0<y<1, and 0<z<1 are satisfied, and also the value of z/(y+z) is greater than or equal to 0.01 and less than or equal to 0.2; and
   (VII) Formulae s+t≈1, 0≤s≤1 (s is greater than or equal to 0 and less than or equal to 1), and 0≤t≤1 (t is greater than or equal to 0 and less than or equal to 1) are satisfied, and
   wherein the positive electrode active material satisfies at least one of conditions (V) and (VI):
   (V) The positive electrode active material has a crystal structure belongs to the space group P121/n1; and
   (VI) The positive electrode active material has a crystal structure belongs to the space group Pmn21.

6. The positive electrode active material of a power storage device according to claim 5, wherein x satisfies 0≤x≤2 (x is greater than or equal to 0 and less than or equal to 2).

7. The positive electrode active material of a power storage device according to claim 5, wherein Formula y+z=1 and Formula s+t=1 are satisfied.

8. A power storage device comprising a positive electrode of a power storage device, the positive electrode comprising:
   the positive electrode active material of a power storage device according to claim 5; and
   a collector.

9. A positive electrode active material of a power storage device,
   wherein the positive electrode active material is represented by a general formula $Li_{(2-x)}(Fe_sNi_u)_yM2_zSiO_4$ and satisfies conditions (I), (III), (IV), and (VIII):
   (I) x satisfies 0≤x<2 (x is greater than or equal to 0 and less than 2);
   (III) M2 is a metal atom that is titanium (Ti), scandium (Sc), or magnesium (Mg);
   (IV) Formulae y+z≈1, 0<y<1, and 0<z<1 are satisfied, and also the value of z/(y+z) is greater than or equal to 0.01 and less than or equal to 0.2; and
   (VIII) Formulae s+u≈1, 0≤s≤1 (s is greater than or equal to 0 and less than or equal to 1), and 0≤u≤1 (u is greater than or equal to 0 and less than or equal to 1) are satisfied, and
   wherein the positive electrode active material satisfies at least one of conditions (V) and (VI):
   (V) The positive electrode active material has a crystal structure belongs to the space group P121/n1; and
   (VI) The positive electrode active material has a crystal structure belongs to the space group Pmn21.

10. The positive electrode active material of a power storage device according to claim 9, wherein x satisfies 0≤x≤2 (x is greater than or equal to 0 and less than or equal to 2).

11. The positive electrode active material of a power storage device according to claim 9, wherein Formula y+z=1 and Formula s+u=1 are satisfied.

12. A power storage device comprising a positive electrode of a power storage device, the positive electrode comprising:

the positive electrode active material of a power storage device according to claim 9; and a collector.

13. A positive electrode active material of a power storage device, wherein the positive electrode active material is represented by a general formula $Li_{(2-x)}(Fe_sMn_tNi_u)_yM2_z SiO_4)$ and satisfies conditions (I), (III), (IV), and (IX):

(I) x satisfies $0 \leq x < 2$ (x is greater than or equal to 0 and less than 2);

(III) M2 is a metal atom that is titanium (Ti), scandium (Sc), or magnesium (Mg);

(IV) Formulae $y+z \approx 1$, $0<y<1$, and $0<z<1$ are satisfied, and also the value of $z/(y+z)$ is greater than or equal to 0.01 and less than or equal to 0.2; and (IX) Formulae $s+t+u \approx 1$, $0 \leq s \leq 1$ (s is greater than or equal to 0 and less than or equal to 1), $0 \leq t \leq 1$ (t is greater than or equal to 0 and less than or equal to 1), and $0 \leq u \leq 1$ (u is greater than or equal to 0 and less than or equal to 1) are satisfied, and wherein the positive electrode active material satisfies at least one of conditions (V) and (VI):

(V) The positive electrode active material has a crystal structure belongs to the space group P121/n1; and (VI) The positive electrode active material has a crystal structure belongs to the space group Pmn21.

14. The positive electrode active material of a power storage device according to claim 13, wherein x satisfies $0 \leq x \leq 2$ (x is greater than or equal to 0 and less than or equal to 2).

15. The positive electrode active material of a power storage device according to claim 14, wherein Formula y+z=1 and Formula s+t+u=1 are satisfied.

16. A power storage device comprising a positive electrode of a power storage device, the positive electrode comprising:

the positive electrode active material of a power storage device according to claim 13; and a collector.

17. A manufacturing method of a positive electrode active material of a power storage device, comprising the steps of:

mixing a material comprising lithium, a material comprising metal M1, a material comprising metal M2, and a material comprising silicic acid; and baking the mixed materials, wherein conditions (X) to (XII) are satisfied:

(X) M1 is one or more metal atoms selected from iron (Fe), nickel (Ni) manganese (Mn), and cobalt (Co);

(XI) M2 is a metal atom that is titanium (Ti), scandium (Sc), or magnesium (Mg); and (XII) The molar ratio of the metal M2 atoms to the sum of the metal M1 atoms and the metal M2 atoms in the mixed materials is greater than or equal to 0.01 and less than or equal to 0.2, and wherein the positive electrode active material satisfies at least one of conditions (V) and (VI):

(V) The positive electrode active material has a crystal structure belongs to the space group P121/n1; and (VI) The positive electrode active material has a crystal structure belongs to the space group Pmn21.

18. The manufacturing method of a positive electrode active material of a power storage device according to claim 17, wherein the baking step is performed at a temperature higher than or equal to 800° C. and lower than or equal to 1100° C. for a time greater than or equal to 10 hours and less than or equal to 15 hours.

\* \* \* \* \*

UNITED STATES PATENT AND TRADEMARK OFFICE
CERTIFICATE OF CORRECTION

PATENT NO. : 8,669,009 B2
APPLICATION NO. : 13/160660
DATED : March 11, 2014
INVENTOR(S) : Masaki Yamakaji It is certified that error appears in the above-identified patent and that said Letters Patent is hereby corrected as shown below:

In the Specification:

Column 3, line 25, "$0 \leq x \leq 2$" should read "$0 \leq x < 2$"

Column 3, line 50, "$0 \leq x \leq 2$" should read "$0 \leq x < 2$"

Column 4, line 45, "$(Fe_sNi_y)_y$" should read "$(Fe_sNi_u)_y$"

Column 4, line 45, "$(Fe_sMn_tNi_u)_y$" should read "$(Fe_sMn_tNi_u)_y$"

Column 7, line 11, "$Li_2Mn_yM2_2SiO_4$" should read "$Li_2Mn_yM2_zSiO_4$"

Column 7, line 43, "$0 \leq x \leq 2$" should read "$0 \leq x < 2$"

Column 8, line 1, "$0 \leq x \leq 2$" should read "$0 \leq x < 2$"

Column 8, line 19, "$s + u \leq u = 1$" should read "$s + u \approx 1$"

Column 10, line 50, "$M1M2_z$" should read "$M1_yM2_z$"

In the Claims:

Claim 1, Column 17, line 45, "Li(2-x,)" should read "Li(2-x)"

Claim 5, Column 18, line 8, "$M2,SiO_4$" should read "$M2_zSiO_4$"

Claim 15, Column 19, line 31, "claim 14" should read "claim 13"

Claim 17, Column 20, line 13, "(Ni) manganese" should read "(Ni), manganese"

Signed and Sealed this
Fourth Day of November, 2014

Michelle K. Lee
*Deputy Director of the United States Patent and Trademark Office*